United States Patent [19]
De Smit

[11] 3,747,567
[45] July 24, 1973

[54] ANIMAL CAGE WITH PORTABLE CONTAINER
[75] Inventor: Phillip A. De Smit, Portage, Mich.
[73] Assignee: Unifab Corporation, Kalamazoo, Mich.
[22] Filed: Oct. 22, 1971
[21] Appl. No.: 191,639

[52] U.S. Cl. .................................... 119/17, 119/96
[51] Int. Cl. ............................................. A01k 31/06
[58] Field of Search ............................... 119/17, 96

[56] References Cited
UNITED STATES PATENTS
3,094,101    6/1963    Porter .............................. 119/96 X
3,467,064    9/1969    Glass et al. .......................... 119/17

Primary Examiner—Russell R. Kinsey
Assistant Examiner—J. A. Oliff
Attorney—Woodhams, Blanchard and Flynn

[57] ABSTRACT

An animal cage having elongated wall means defining an elongated animal retaining housing which has a pair of animal retaining end wall means adapted to cover the ends of the housing. Fastening means are provided for releasably securing one of the end wall means to the housing to provide access to the interior thereof. Carriage means are mounted on the housing and movable longitudinally thereof with the other of the wall means being secured thereto and movable therewith toward and away from the first mentioned end wall means. Coupling means are provided for coupling of the first mentioned end wall means to the second mentioned end wall means. Each of the end wall means is shaped to cooperate with the other to define a relatively small restraining cage to restrain the movements of an animal contained therein. The pair of end wall means, when secured together, are removable as a unit from the housing after the second mentioned end wall means is released from the carriage means.

5 Claims, 9 Drawing Figures

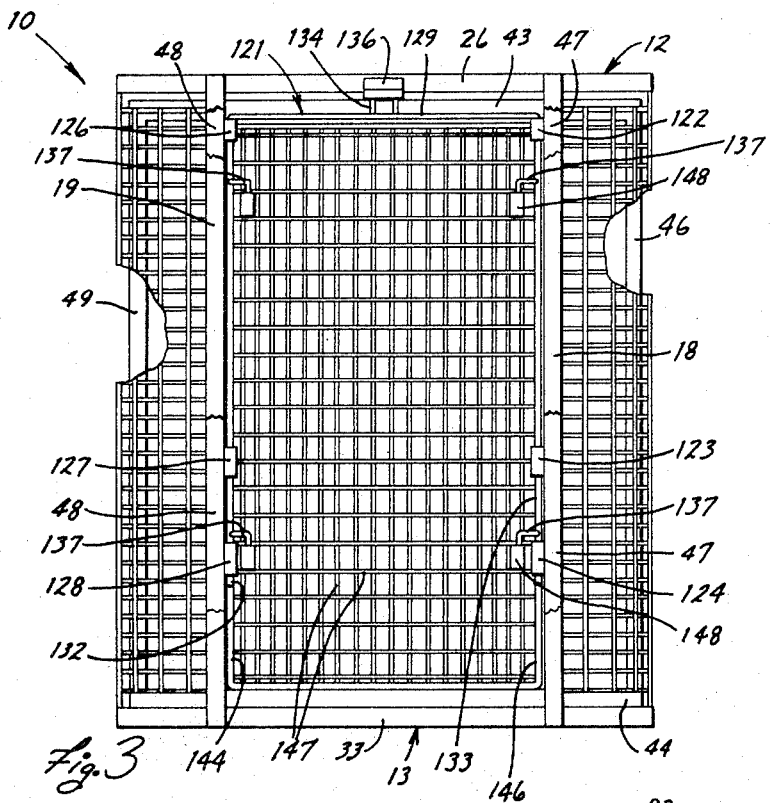
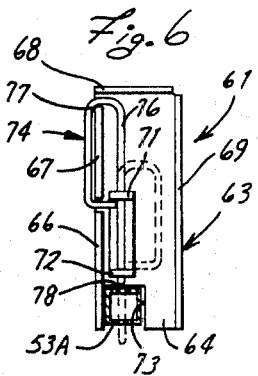
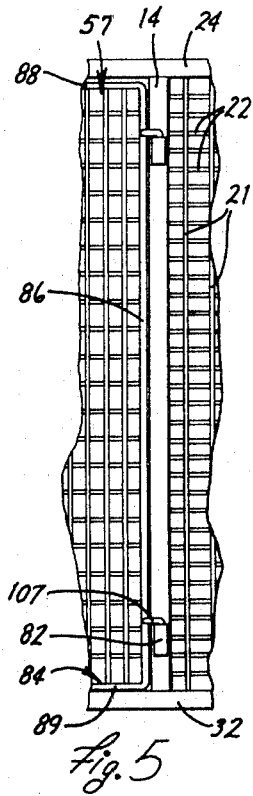
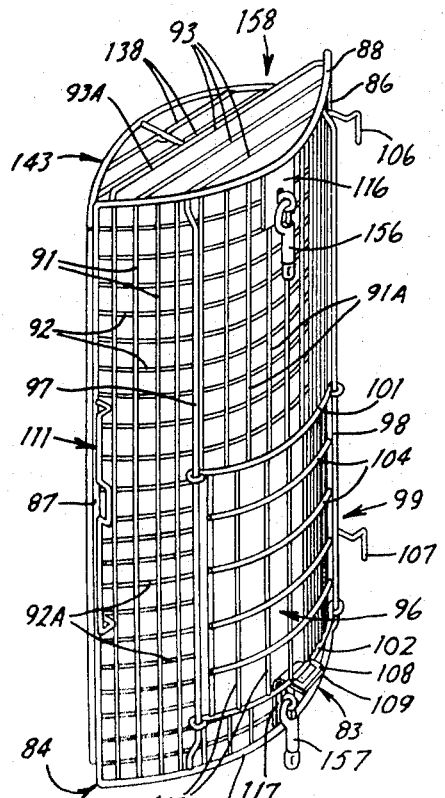

ANIMAL CAGE WITH PORTABLE CONTAINER

FIELD OF THE INVENTION

This invention relates to an animal cage and, more particularly, relates to an animal cage having an animal restraining device mounted thereon which is removable from the cage structure to permit an animal to be restrained while being carried between the cage and a location separate therefrom.

BACKGROUND OF THE INVENTION

Animal cages having animal restraining devices thereon are known in the art but each of the known restraining devices are limited in the manner in which they can be used. More particularly, the known animal restraining devices are usually, as far as I am aware, an integral part of the cage structure and the restraining apparatus, excepting as mentioned below, cannot be removed from the cage structure so that the restrained animal can be treated at a location separate from the cage. Further, the animal cage structures known to me do not usually permit ready access to the restrained animal from all sides.

There is, however, at least one known animal cage wherein the restraining device is removable from the cage structure so that the animal can be treated at a location spaced from the cage structure. This animal cage structure is illustrated in an advertisement appearing in the publication entitled "Laboratory Animal Care," Volume 19, No. 5, Part I (October, 1969) on Page 570 and manufactured by the ABCO Wire and Metal Products Inc. in Hayward, Calif.

While these and other cages of this type which are known to me are satisfactory for general use, there is still an unsatisfied demand, especially from laboratories utilizing primates, for an improved cage of this general type. Particularly, the known cages have been clumsy and time consuming to operate and have often failed to protect adequately the personnel handling the animal.

Accordingly, the objects of this invention include:

1. To provide an improved animal cage, particularly for primates, and which includes a restraining device which is adapted to be removable from the cage structure so that the animal may be carried, while in a restrained condition, to a location separate from the cage structure.

2. To provide an improved animal cage, as foresaid, wherein the restraining device is hingedly secured to the cage structure so that the restraining device may be swung about the axis of the hinge to expose all parts of the animal contained therein without necessitating the removal of the restraining device from the cage structure.

3. To provide an improved animal cage, as aforesaid, which is sturdy enough for use with large animals and in which the restraining device is also particularly sturdy for use with large primates.

4. To provide an improved cage structure wherein the handles on a carriage, which permit a movement of one wall of the cage toward the opposite wall in order to restrain the animal therebetween, are movable out of the way after the wall on the carriage has been detached therefrom and secured to the opposite wall so that a number of persons, such as laboratory personnel, may congregate around the restrained animal without any interference being presented by the handles of the carriage.

Other objects and purposes of this invention will be apparent to persons acquainted with cage structures of this general type upon reading the following specifications and inspecting the accompanying drawings, in which:

FIG. 3 is a rear elevational view of the animal cage;

FIG. 4 is a sectional view taken along the line IV—IV of FIG. 2;

FIG. 5 is a view taken along the line V—V of FIG. 2;

FIG. 6 is a sectional view taken along the line VI—VI of FIG. 2;

FIG. 7 is a perspective view of the restraining cage removed from the cage structure of FIG. 1;

Figure 1:
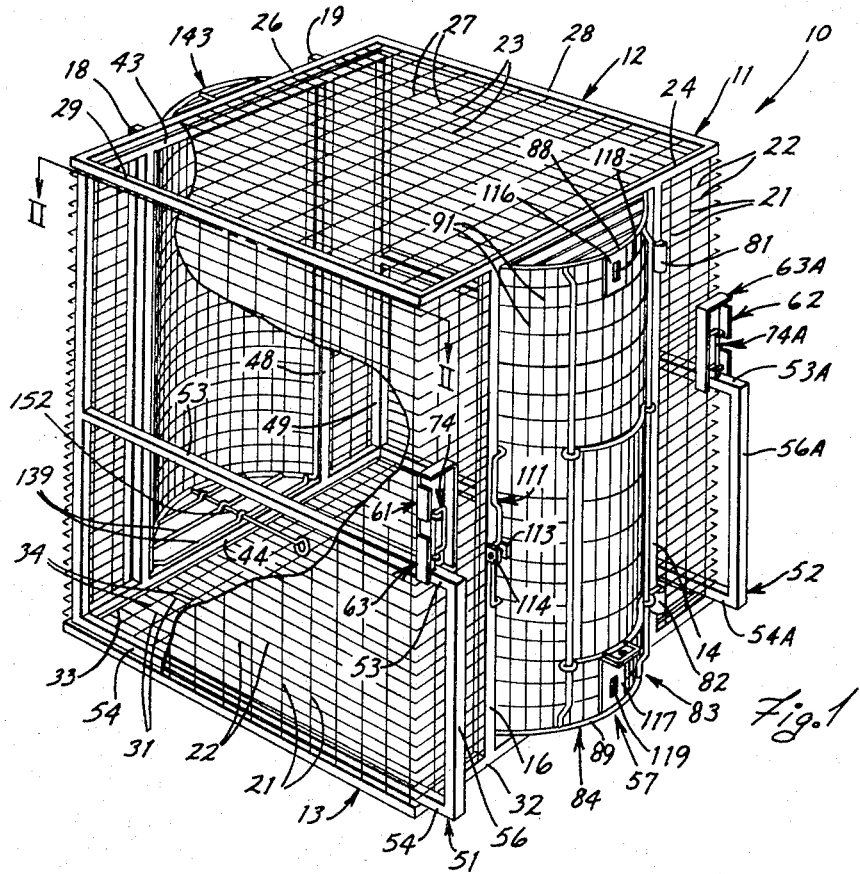
FIG. 1 is a perspective view of an animal cage embodying the invention.

Certain terminology will be used in the following description for convenience in reference only and will not be limiting. The words "up," "down," "right" and "left" will designate directions in the drawings to which reference is made. The words "front" and "rear" will refer to the front and rear sides of the animal cage with the front being the right side of FIG. 2 and the rear being the left side of FIG. 2. The words "in" and "out" will refer to directions toward and away from, respectively, the geometric center of the device and designated parts thereof. Such terminology will include derivatives and words of similar importance.

SUMMARY OF THE INVENTION

The objects and purposes of the invention are met by providing an improved animal cage having elongated wall means defining an elongated animal retaining housing which opens outwardly at opposite longitudinal ends thereof. End wall means are provided to cover the longitudinal ends of the housing with fastening means being provided for releasably securing one of the end wall means to the housing to provide access to the interior of the housing. Carriage means are mounted on the housing and movable longitudinally thereof with the other end wall means being releasably secured thereto and movable therewith toward and away from the first mentioned end wall means. Coupling means are provided for coupling the first mentioned end wall means to the second mentioned end wall means when the carriage has moved the second mentioned end wall means closely adjacent the first thereof. The first mentioned and second mentioned end wall means are shaped to cooperate with each other to define a relatively small restraining cage to restrain the movements of the animal contained therein when said end wall means are located close together. Further, the second mentioned end wall means is removable from the housing when same is attached to the first mentioned end wall means and when the second mentioned end wall means is released from the carriage means.

DETAILED DESCRIPTION

An animal cage 10 (FIG. 1) embodying the invention comprises a frame 11 composed of a pair of horizontally disposed, vertically spaced, rectangularly shaped, frame members 12 and 13 interconnected by vertical bars 14 and 16 on the front side of the frame 11 and vertical bars 18 and 19 on the rear side of the frame 11.

A plurality of vertical wire rods 21 are secured to and extend between the upper frame member 12 and the lower frame member 13. There are, however, no wire rods 21 secured to the upper frame member 12 or the lower frame member 13 between the vertical bars 14 and 16 at the front of the cage 10 or between the vertical bars 18 and 19 at the rear thereof. A plurality of vertically spaced and parallel wire rods 22 are secured to each of the wire rods 21 and extend generally perpendicular thereto. Each of the horizontally extending wire rods 22 is generally U-shaped with one end thereof being secured to one of the vertical bars 14 and 16 and the other end thereof being secured to one of the vertical bars 18 and 19.

A plurality of horizontally spaced and parallel wire rods 23 are connected to and extend between the horizontally spaced and parallel bars 24 and 26 of the upper frame 12. A plurality of horizontally spaced and parallel wire rods 27 are secured to and extend generally perpendicular to each of the wire rods 23. The wire rods 27 are further secured to the horizontally spaced and parallel bars 28 and 29 (FIG. 1) of the upper frame 12. Similarily, and referring to FIG. 2, a plurality of horizontally spaced and parallel wire rods 31 are secured to and extend between the horizontally spaced and parallel bars 32 and 33 of the lower frame 13. A plurality of parallel and horizontally spaced wire rods 34 are secured to each of the wire rods 31 and are further secured to and extend between the horizontally spaced and parallel bars 36 and 37 of the lower frame 13.

Figure 8:
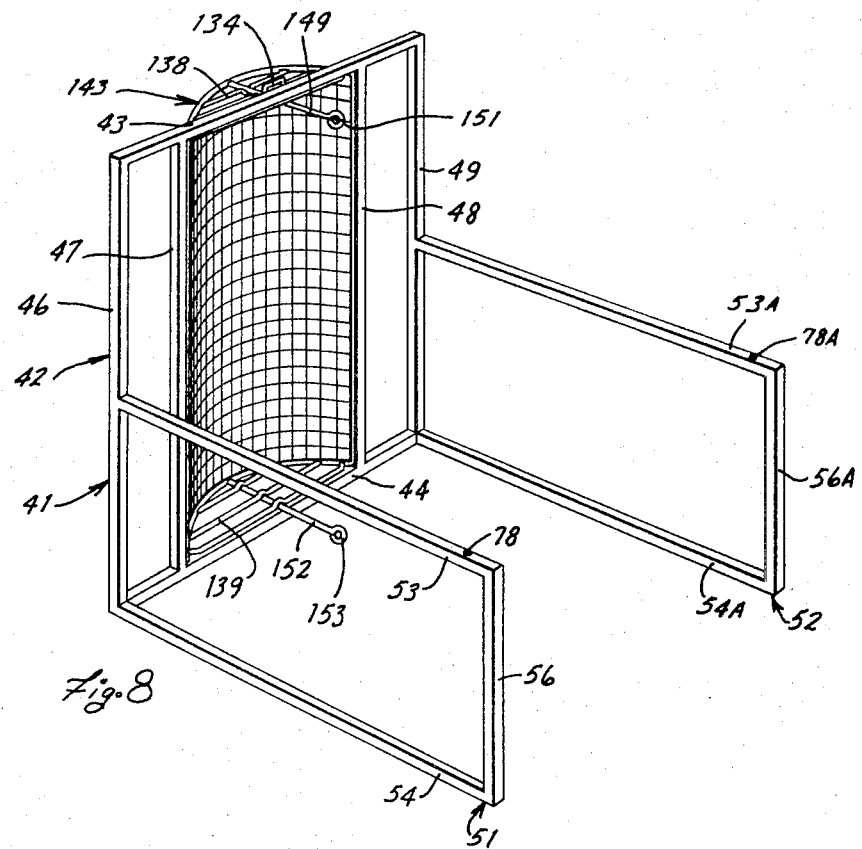
FIG. 8 is perspective view of the movable carriage.

A carriage 41 (FIGS. 2 and 8) is slidably mounted internally of the cage 10. The carriage 41 comprises an upstanding rectangular-shaped frame 42 having a pair of vertically spaced upper and lower bars 43 and 44, respectively, connected by a plurality of horizontally spaced vertical bars 46, 47, 48 and 49. The bars 47 and 48 are horizontally spaced a distance equal to the horizontal spacing between the bars 18 and 19 of the frame 11. The peripheral dimension of the rectangular-shaped frame 42 is slightly less than the perimeter dimension of the inside of the cage 10 so that the frame 42 can slide on the lower frame member 13 while in an upright position longitudinally between the rear and front walls of the cage 10.

Figure 2:
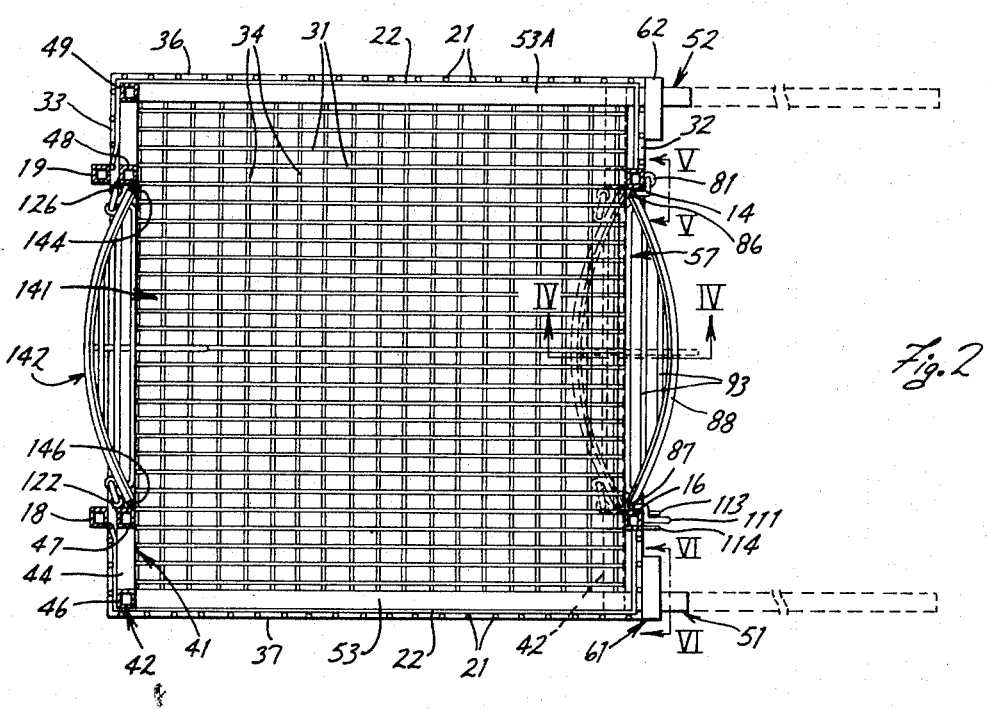
FIG. 2 is a section view taken along the line II—II of FIG. 1.

A pair of handles 51 and 52 are secured, here permanently, to the carriage 41. More particularly, the handle 51 comprises a pair of horizontally extending, vertically spaced bars 53 and 54 which are secured at their rear ends to vertically spaced locations on the vertical bar 46 of the frame 42. The bars 53 and 54 extend forwardly from the frame 42 through the front wall of the cage between a pair of vertically spaced wire rods 22 and the outer ends thereof are connected by a vertically extending bar 56. The handle 52 is identical to the handle 51 and the same reference numerals have been used to designate the corresponding components except that the reference "A" has been added thereto. The handles 51 and 52 are spaced on opposite sides of an opening 57 defined by the vertical bars 14 and 16 and the bars 24 and 32 of the upper frame 12 and the lower frame 13, respectively. Thus, by pulling each of the handles 51 and 52 outwardly, perpendicularly away from the front wall of the cage 10, the carriage 41 will be moved from a position adjacent the rear wall as illustrated in FIG. 2 to a position adjacent the front wall as illustrated in broken lines in FIG. 2.

A pair of locking devices 61 and 62 are mounted on the front wall of the cage 10. Referring to FIG. 6, the locking device 61 comprises a housing 63 having a base plate 64 and upstanding sidewalls 66, 67, 68 and 69 extending perpendicularly away therefrom. The bottom end of the housing 63 is open and has no upstanding side wall thereacross. A pair of vertically spaced ears 71 and 72 extend perpendicularly outwardly from the base plate 64 and each ear has an opening therein axially aligned with the opening in the other ear. A notch 73 is provided in the base plate 64, which notch opens downwardly and is aligned with the openings in the ears 71 and 72.

The locking device 61 is positioned on the front wall of the cage 10 in such a manner as to receive into its notch 73 the bar 53 of the handle 51. A locking bolt 74 (FIGS. 1 and 6) comprises a vertically extending pin 76 which extends downwardly through the axially aligned opening in the ears 71 and 72. A hook 77 is provided adjacent the upper end of the pin 76 and is adapted to hook over the upper edge of the upstanding wall 67 of the base 63. When the hook 77 is moved out of engagement with the upper surface of the upstanding wall 67, the pin 76 is permitted to drop downwardly to the broken line position illustrated in FIG. 6 whereby the pin 76 extends through an opening 78 in the bar 53 of the handle 52 to lock the carriage 41 in a fixed and desired location within the cage 10.

The locking device 62 is a mirror image of the locking device 61 and a detailed discussion thereof is believed unnecessary. However, several of the reference numerals appearing in FIG. 6 have been applied to the locking device 62 in FIG. 1 with the suffix "A" added thereto.

A pair of vertically spaced hinged knuckles 81 and 82 (FIG. 1) are secured to the vertical bar 14 on the front wall of the cage 10. A door 83 is hingedly secured, as described below, to the hinge knuckles 81 and 82 and is adapted to swing outwardly from the front wall of the cage 10 about the axis defined by the hinge knuckles 81 and 82. The door 83 comprises an annular wire rod frame 84 (FIGS. 4 and 9) having vertical wire rods 86 and 87 on the lateral sides thereof interconnected by horizontally extending but arcuately curved rods 88 and 89 secured to the upper ends of the wire rods 86 and 87. A plurality of vertical, horizontally spaced and parallel wire rods 91 are connected to and extend between the vertically spaced wire rods 88 and 89 of the frame 84. Similarily, a plurality of vertically spaced and parallel wire rods 92 are secured to and extend between the wire rods 86 and 87 of the frame 84. Further, the wire rods 91 and 92 are interconnected to define an arcuately curved surface concentric with the arcuate wire rods 88 and 89 of the frame 84. The curvature of the door 84 projects outwardly from the front wall of the cage 10 as illustrated in FIGS. 1 and 2.

A plurality of horizontally spaced and parallel wire rods 93 (FIGS. 4 and 7) are secured to the arcuate wire rod 88 of the frame 84 so that the rearwardmost wire rod 93A is coplanar with the wire rods 86 and 87. Similarily, a plurality of horizontally spaced wire rods 94 (FIG. 4) are secured to the arcuate wire rod 89 of the frame 84 in an identical manner as the wire rods 93. Several of the wire rods 91 and 92, identified by the reference numerals 91A and 92A in FIG. 7 are cut to define an opening 96 through the door 83.

A pair of guide rails 97 and 98 are fastened to the upper and lower wire rods 88 and 89 of the frame 84 and are located on the lateral opposite sides of the opening 96. A guillotine type gate 99 is vertically slidably mounted on the guide rails 97 and 98. The guillotine gate 99 comprises a pair of vertically spaced bars 101 and 102 which are slideably secured to the guide bars 97 and 98 on the door 83. A plurality of horizontally spaced and parallel wire rods 103 are secured to and extend between the wire rods 101 and 102. A plurality of vertically spaced and parallel wire rods 104 are secured to each of the wire rods 103 to define a mesh type construction for covering the opening 96 in the door 83.

A pair of vertically spaced pins 106 and 107 are secured to the wire rod 86 on the door 83 and are received by the hinge knuckles 81 and 82 to support the door for pivotal movement about the axis of the hinge knuckles 81 and 82.

A loop 108, comprising both a handle and one part of a lock, is secured at the bottom edge of the guillotine gate 99 to the bottommost wire rod 104. The loop 108 in its capacity as part of a lock, is designed to cooperate with an outwardly projecting tab 109 secured to the front surface of the door 83 adjacent the bottom edge of the opening 99 so that the guillotine gate 99 can be locked in the closed position by any conventional means, not illustrated.

The door 83 also comprises a handle 111 secured to the wire rod 87 (FIG. 7) and has a portion thereof receivable between a pair of ears 113 and 114 (FIG. 1) secured to the vertical bar 16 on the front wall of the cage 10 so that a locking bolt (not illustrated) may be attached to the ears 113 and 114 in a conventional manner to lock the door 83 in the closed position.

A pair of vertically spaced plates 116 and 117 (FIGS. 1, 4 and 7) are secured to the frontwardmost part of the door 83 adjacent the top and bottom thereof. The plate 116 has an opening 118 therethrough and the plate 117 has an opening 119 therethrough.

Figure 9:
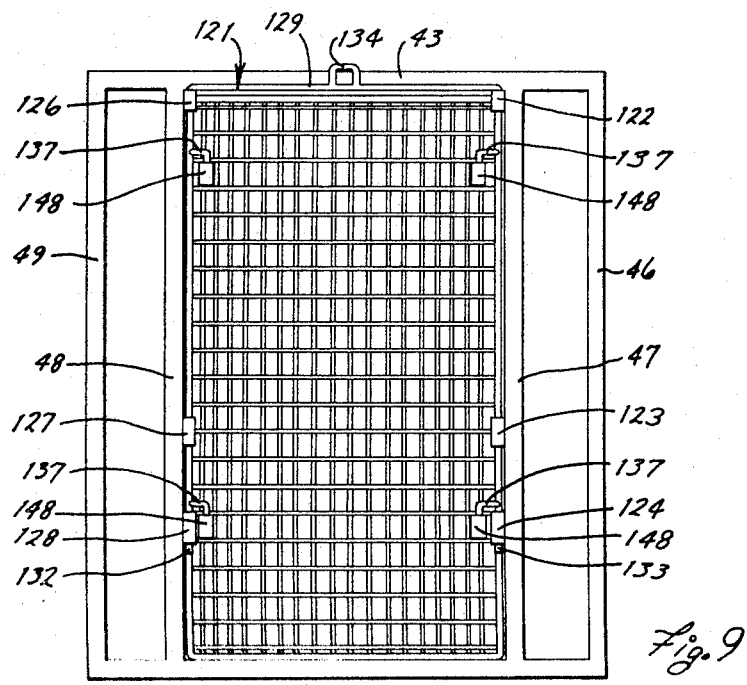
FIG. 9 is a rear elevational view of the carriage.

Now turning to the back portion as best seen in FIGS. 3 and 9, a plurality of vertically spaced and aligned knuckles 122, 123 and 124 are secured to the vertical bar 47 and a plurality of vertically spaced and aligned knuckles 126, 127 and 128 are secured to the vertical bar 48. A frame 121 (FIG. 9) comprises horizontal wire rod 129 having secured at its opposite ends horizontally spaced and parallel vertical wire rods 132 and 133. The wire rod 132 extends through the knuckles 126, 127 and 128 and the wire rod 133 extends through the knuckles 122, 123 and 124 to slideably support the frame 121 for vertical movement. A lift tab 134 is secured to the wire rod 129 and extends upwardly therefrom. A locking tab 136 (FIG. 3) is secured to the rear surface of the bar 26 of the upper frame 12 of the cage 10 and is designed to prevent an inadvertent upward movement of the frame 121 when the carriage 41 is positioned adjacent the back wall of the cage 10. A plurality of fingers 137 are secured to the wire rods 132 and 133 and project inwardly of the frame 121 as illustrated in FIG. 3.

The opening 141 (FIG. 2) between the vertical bars 18 and 19 of the frame 11 of the animal cage 10 and between the vertical bars 47 and 48 of the frame 42 of the carriage 41 is normally closed by a gate 142 which is releasably secured to the carriage 41. The gate 142 has a construction similar to the door 83 at the front end of the cage 10. More particularly, the gate 142 comprises an wire rod frame 143 143 (FIG. 7) wherein the horizontal spacing between the wire rods 144 and 146 (FIG. 2) is generally identical to the horizontal spacing between the wire rods 86 and 87 of the door 83. The vertically spaced ends of the frame 143 are arcuately and outwardly curved. A plurality of horizontally spaced and parallel as well as vertically spaced and parallel wire rods 147 are secured to the frame 143 and to each other to define a wire mesh construction. A plurality of horizontally spaced and parallel wire rods 138 and 139 (FIG. 8) are secured to the spaced ends of the frame 143. A plurality of tubular sleeve members 148 (FIG. 9) are secured to the wire mesh defined by the wire rods 147 and are aligned with the fingers 137 secured to the annular frame 121 so that the gate 142 is releasably secured to the vertical bars 47 and 48 of the frame 42 of the frame 41.

A wire rod 149 (FIGS. 4 and 8) having an eyelet 151 at the forward end thereof is secured to the upper surface of the wire rods 138 of the gate 142 and is aligned with the opening 118 in the plate 116 secured to the door 83. Similarly, a wire rod 152 is secured to the bottom surface of wire rods 139 of the gate 142 and has an eyelet 153 at the forward end thereof. The wire rod 152 and eyelet 153 are aligned with the opening 119 in the plate 117 secured to the gate 83.

OPERATION

Although the operation of the animal cage described above will be understood from the foregoing description by skilled persons, a summary of such description is now given for convenience.

The animal cage 10 described above is designed to hold a variety of animals but is more particularly adapted for holding primates. When it is desired to administer medication or to perform some of type of operation on the animal in the cage, the handles 51 and 52 are pulled outwardly from the cage to move the carriage 41 from a position adjacent the back wall of the cage to a position adjacent the front wall. When the carriage 41 has been moved as far forward as possible to the broken line position illustrated in FIG. 2, the locking pins 74 and 74A in the locking devices 61 and 62 are moved from the solid line position (FIG. 6) to the broken line position to lock the handles 51 and 52 in the fully extended position. This will prevent the primate from urging the carriage 41 rearwardly when trapped or restrained between the door 83 and the gate 142.

When the carriage 41 has been moved to the forwardmost position, the eyelets 151 and 153 will extend through the openings 118 and 119 as illustrated in FIG. 4 and the rear gate 142 may be secured to the door 83 by conventional locking devices 156 and 157 (FIGS. 4 and 7). After the gate 142 has been secured to the door 83, the handle or tab 134 (FIGS. 3 and 9), which is now located adjacent the front wall of the cage 10 by reason of the fact that the carriage 41 has been moved forwardly as far as possible, may be lifted upwardly through one of the openings in the wire mesh construction so that the frame 121 will be moved upwardly therewith to pull the fingers 137 out of engagement with the tubular sleeves 148 to thereby free the gate 142 from engagement with the frame 42. Thus, the assembly comprising the door 83 and the gate 142 define a restraining cage 158 (FIGS. 4 and 7) in which the animal is contained and may be inspected while restrained therein. Further, when the lock fastened to the ears 113 and 114 is removed, the door 83, as well as the gate 142, may be swung outwardly of the cage about the axis of the pins 106 and 107 in the hinge knuckles 81 and 82. Thus, and if desired, the opposite side of the animal may be exposed for treatment without removing the restraining cage 158 from the animal cage 10. Further, and if desired, the restraining cage 158 may be removed from the hinge knuckles 81 and 82 by simply lifting the restraining cage upwardly so that the fingers 106 and 107 are pulled upwardly from the knuckles 81 and 82. Thus, the restraining cage may be carried to a location remote from the animal cage structure 10.

If work on the animal is to be performed while keeping the door secured to the cage 10, the locking pins 74 and 76 may be again raised from the broken line position (FIG. 6) to the solid line position so that the handles 51 and 52 may be pushed rearwardly back to the position illustrated in FIG. 1. In this instance, however, the gate 142 would remain secured to the door 83 but the handle 51 and 52 would be out of the way so that laboratory personnel can be positioned adjacent the front of the cage where the animal would be restrained in the restraining cage so that the laboratory personnel would not be inconvenienced by the presence of the handles 51 and 52.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An animal cage, comprising:
    wall means defining an animal retaining housing open at opposite ends thereof;
    first and second animal retaining end wall means for closing said ends of said housing;
    releasable fastening means for releasably securing said first end wall means to said housing to provide, upon releasing thereof, access to the interior of said housing;
    carriage means mounted on said housing and movable longitudinally thereof;
    releasable securement means for (1) securing said second end wall means to said carriage means for movement with said carriage means from a position longitudinally spaced from said first end wall means to a position closer to said first wall means and for (2) releasing the securement between said second end wall means and said carriage means so that said carriage means is permitted to move relative to said second end wall means; and
    releasable coupling means separate from said carriage means and said housing for permitting a releasable coupling between said first end wall means and said second end wall means, at least one of said first and second end wall means including means separate from said carriage means and said housing for defining a small restraining cage when said first and second end wall means are coupled together, said first and second end wall means, when coupled together by said releasable coupling means and when the securement by said releasable securement means between said second wall means and said carriage means is released, being removable from said housing for transportation to a location remote from said housing.

2. An animal cage according to claim 1, wherein said carriage means includes means defining a handle permanently secured thereto and which projects longitudinally outwardly from the end of said housing containing said first end wall means; and
    wherein said handle means are adapted to be pulled outwardly of said housing away from said first end wall means to cause said movement of said second wall means toward said first wall means.

3. An animal cage according to claim 1, wherein said releasable fastening means comprises means defining a hinge to hingedly secure said first end wall means to said housing.

4. An animal cage according to claim 1, wherein the inwardly facing surface of at least one of said first and second end wall means has a concave form.

5. An animal cage according to claim 4, wherein said inwardly facing surface is part of an elongated, cylindrical concave form which includes wall members secured to the longitudinal ends of said concave form and extending inwardly from said concave surface and terminating in the plane of the longitudinal edges of said concave form.

* * * * *